3,053,335
TRACTION CONTROL SUSPENSION ARRANGEMENT FOR MULTIPLE AXLE TRACTOR VEHICLES
Walter Gnade and Ewald Pekrul, Hannover, Germany, assignors to Westinghouse - Bremsen - Gesellschaft, m.b.H., Hannover, Germany
Filed Jan. 16, 1961, Ser. No. 82,883
Claims priority, application Germany Jan. 18, 1960
5 Claims. (Cl. 180—22)

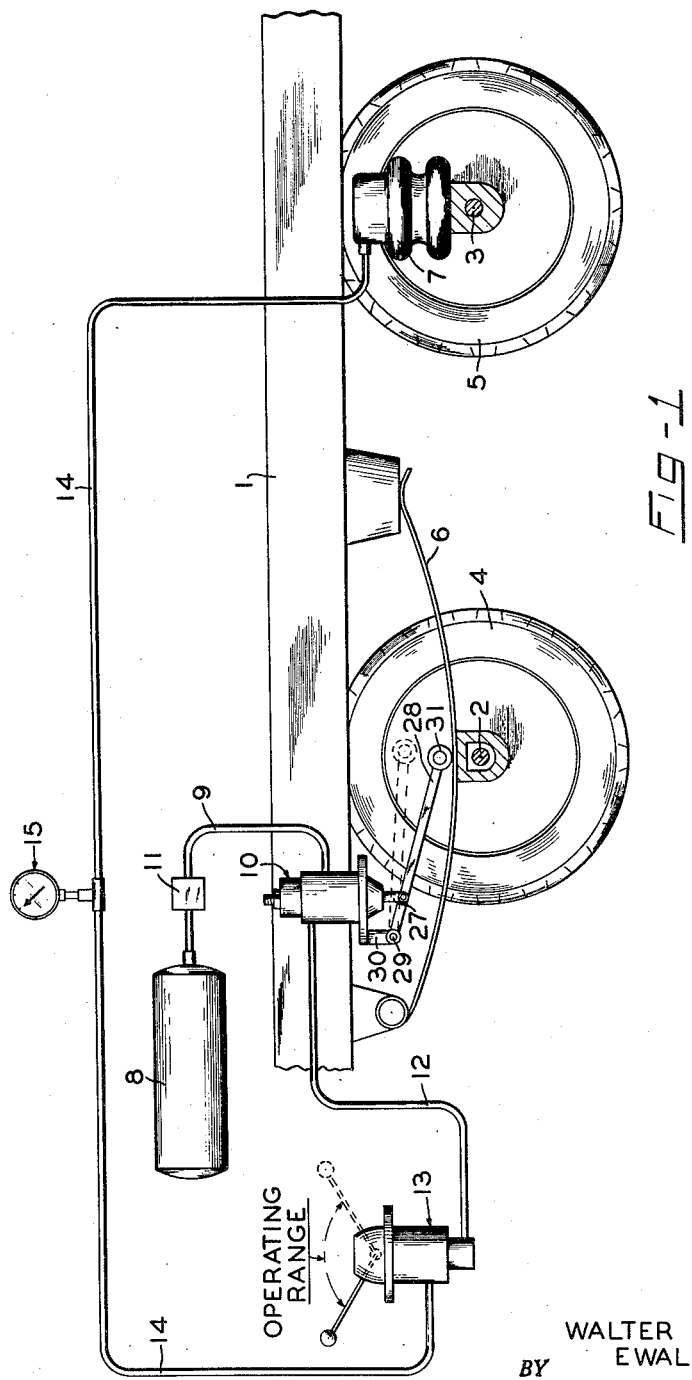

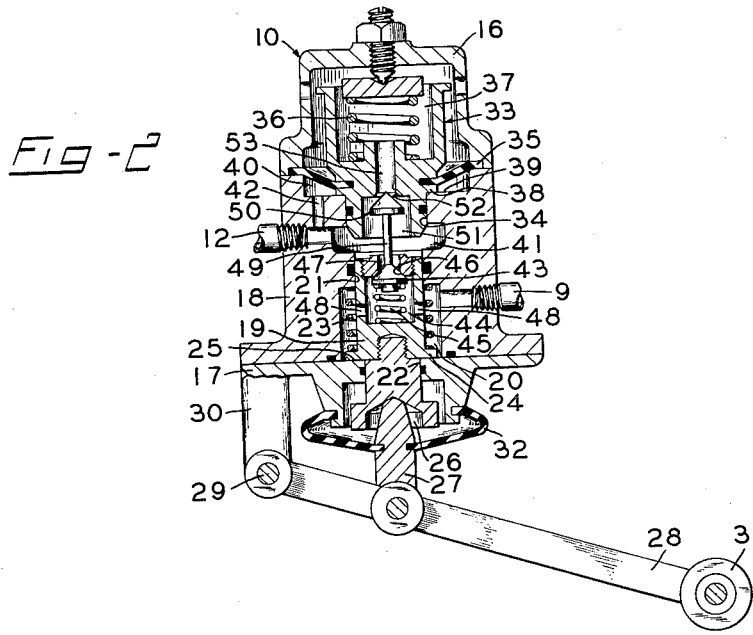
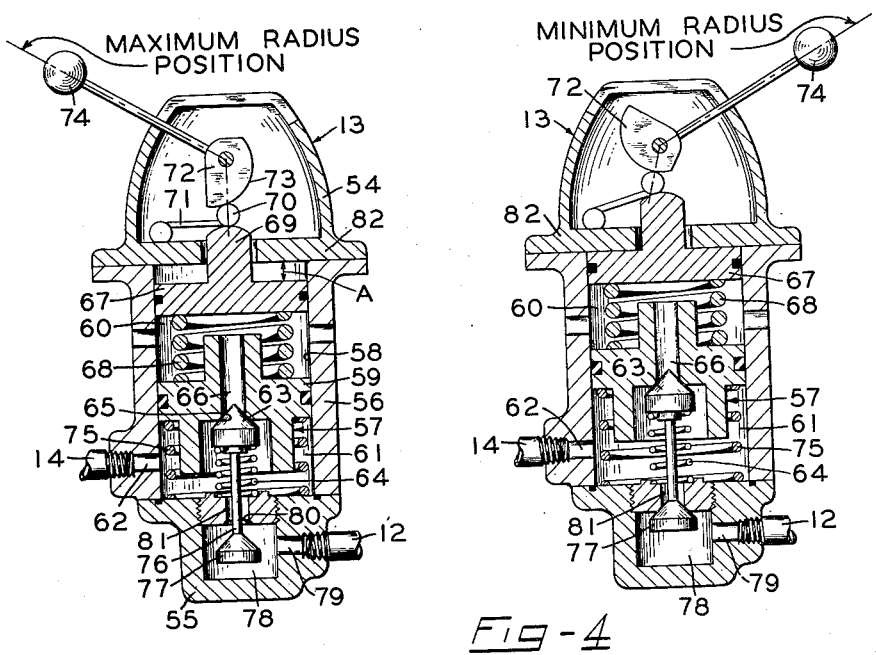

This invention relates to a suspension arrangement for tractor vehicles and, more particularly, to such an arrangement for multiple axle tractor vehicles whereby the proportionality of load distribution among the several axles may be varied in order to correspondingly increase or decrease the tractive friction of the respective wheels mounted on said axles, as road conditions demand, such as effecting a load shift so as to place a greater than normal load on the driving axles than on the non-driving axle or axles in order to obtain greater traction on the driving wheels when the road surface is slippery.

The invention herein described and claimed is particularly adaptable to tractor vehicles provided with multiple axles for greater load capacities. Tractor vehicles equipped with multiple axles, at least one of which has propulsion power applied thereto for driving the vehicle, may be equipped with a combined mechanical-pneumatic spring system with leaf or coil type springs for the driving axle or axles and pneumatic or air springs for the non-driving axle or axles. Of course, the amount of deflection of the leaf or coil spring is proportional to the amount of the load supported thereby and, therefore, the pneumatic springs should be operatively arranged with the mechanical springs so as to maintain the height of the vehicle level or at equal heights at the respective points above the several axles or unsprung portions of the vehicle, under normal road conditions in order to provide proper load distribution on the axles. This may be accomplished by having a leveling valve, controlled by deflection of the mechanical spring, for controlling, in well-known manner, supply or release of fluid under pressure to and from, respectively, the air spring in accordance with the mechanical spring deflection as determined by the amount of the load.

Under abnormal road conditions, however, such as when the road surface is slippery due to wet or icy conditions, it may be desirable to shift the load distribution among the several axles in order that a greater than normal load may be placed on the driving axle to provide more effective traction between the driving wheels and the road surface.

Accordingly, the object of this invention is to provide a suspension system for multiple axle tractor vehicles whereby the proportionality of load distribution among the several axles, that is, the driving and non-driving axles, may be varied so as to increase or decrease the amount of load on the driving axle as determined by the condition of the road surface for obtaining maximum tractive friction by the driving wheels. Briefly, the invention comprises mechanical springs, such as the leaf type, for example, for supporting the vehicle on the driving axle or axles and air springs for supporting the vehicle on the non-driving axle or axles, the amount of fluid under pressure maintained in said air springs being effected by respective leveling valve devices operatively connected to the leaf springs and controlled by the amount of deflection thereof for supplying said fluid to said air springs at a degree of pressure corresponding to the amount of said deflection. According to the invention, a manually operable change-over valve device is provided in the system which can be set according to handle position to maintain different air spring pressures up to maximum pressure deliverable by the leveling valve device thereby providing means for shifting a portion of the load on the non-driving axle to the driving axle as the situation may demand. The change-over valve device handle may be set to allow free flow of fluid under pressure through said valve device, in which setting the fluid pressure delivery to the air springs corresponds to leaf spring deflection.

In the drawings, FIG. 1 is a schematic representation of a suspension arrangement embodying the invention for a multiple axle tractor vehicle of which one side only is shown; FIG. 2 is an elevational view, in section, of a leveling valve device employed in the invention; FIG. 3 is an elevational view, in section, of a manually operable changeover valve device employed in the invention and shown with the operating handle in one extreme position; and FIG. 4 is an elevational view, in section, of the change-over valve device with the operating handle in the other extreme position.

*Description and Operation*

As shown in FIG. 1, the suspension system embodying the invention is applied to a multiple axle tractor vehicle of which a side view of a sprung body portion 1 adjacent the rear end of the vehicle is shown supported by a driving axle 2 and a non-driving axle 3. It will be assumed that the front end (not shown) of the vehicle body is supported by another wheel and axle unit (not shown). For purposes of illustrating the invention, only one wheel on each of the axles 2 and 3 is shown, said wheels being identified by the reference numerals 4 and 5, respectively. The body portion 1 is supported by the driving axle 2 through a leaf spring 6 and by the non-driving axle 3 through an air spring 7.

The suspension system embodying the invention further comprises a storage reservoir 8 charged with fluid under pressure to provide a source of pneumatic pressure for the air spring 7. Reservoir 8 is connected through a conduit 9 to a leveling valve device 10 which is operatively controlled by the deflection of leaf spring 6 as determined by the load carried by the vehicle and in a manner hereinafter explained to normally effect supply of pressurized fluid to the air spring 7 in an amount corresponding directly to amount of said load and, therefore, said spring deflection. A check valve device 11 is interposed in conduit 9 to prevent back-flow of fluid under pressure from the leveling valve device 10 to reservoir 8. A conduit 12 connects the leveling valve device 10 to a manually operable change-over valve device 13 which is connected to the air spring 7 through a conduit 14. A suitably located pressure gauge 15 is connected to conduit 14 whereby it is possible for the driver of the vehicle to read the degree of fluid pressure in p.s.i., for example, in the air spring 7 at any given instant.

The air spring 7, a detailed showing thereof not being considered essential to an adequate understanding of the invention, is of the usual type comprising a plurality of flexible inflatable sections made of resilient material and into and out of which fluid under pressure may be supplied and withdrawn, respectively, via conduit 14.

The leveling valve device 10, shown in detail in FIG. 2, is a self-lapping valve device carried by the sprung portion 1 of the vehicle and comprises an upper casing section 16, a lower casing section 17, and an intermediate casing section 18 affixed between said upper and lower casing sections in axial alignment therewith. A supply-valve seat member 19 operably disposed in a fluid pressure inlet chamber 20 formed in casing section 18 and connected to conduit 9 is coaxially slidably operable in axially aligned bores 21 and 22 formed in casing sections 18 and 17, respectively. A spring 23 disposed in chamber 20 and encircling valve seat member 19 serves to bias said valve seat member toward a normal position defined by abutting engagement of an annular shoulder 24 formed on said valve seat member with an annular shoulder 25 surrounding bore 22 in casing section 17. A portion of the valve seat member 19 extends through bore 22 to the exterior of casing section 17 and is provided in the external end thereof with an annular recess 26 in which one end of an operating stem 27 is adapted to ride, the other end of said stem being pivotally connected to an operating rod or lever 28 intermediate the ends of said lever. One end of operating lever 28 is pivotally connected at a terminal point 29 of an extension arm 30 formed on casing section 17 and acting as a fulcrum for said lever while the other end of said lever is provided with a roller 31 which has rolling contact with the leaf spring 6 of the vehicle (see FIG. 1). The amount of deflection of leaf spring 6 as determined by the magnitude of the load carried by the vehicle is reflected by the amount of pivotal movement of lever 28 about the pivot point 29 and, therefore, a corresponding amount of upward movement, as viewed in the drawing, of operating stem 27. Upward movement of stem 27 effects corresponding upward movement of valve seat member 19 out of its normal position to a supply position to be defined hereinafter. A flexible cover 32 sealingly secured to the casing section 17 and to stem 27 prevents dirt from lodging between said stem, said casing section and the external portion of valve seat member 19 to assure trouble-free operation thereof.

A piston member 33 disposed partly in upper casing section 16 and partly in intermediate casing section 18 is axially slidably operable in a guide bore 34 formed coaxially in casing section 18. Piston member 33 further comprises a diaphragm 35 clamped at its outer periphery between the casing sections 16 and 18 and secured concentrically at its inner periphery to piston member 33. A biasing spring 36 disposed in an atmospheric chamber 37 adjacent one side of diaphragm 35 serves to bias piston member 33 toward a normal position defined by abutting engagement of an annular shoulder 38 formed on said piston member with an annular shoulder 39 surrounding bore 34 in casing section 18. The other side of diaphragm 35 opposite the side adjacent atmospheric chamber 37 is subject to fluid pressure in a divided control chamber comprising an upper chamber 40 formed by said diaphragm and casing section 18 adjacent said diaphragm and a lower chamber 41 formed by said casing section and piston member 33 adjacent valve seat member 19, said upper and said lower chambers being connected by a restricted passageway 42 formed in said casing section while the entire control chamber is connected to conduit 12.

The leveling valve device 10 further comprises a supply valve 43 operably disposed in a recess 44 formed in valve seat member 19 and biased by a spring 45, also disposed in said recess, toward a seated position on an annular valve seat 46 surrounding one end of a passageway 47 leading from said recess to lower chamber 41, said recess being open to inlet chamber 20 by a plurality of ports 48 formed in valve seat member 19. When supply valve 43 is in its seated position, therefore, communication between inlet chamber 20 and control chamber 40—41 is cut off. Supply valve 43 is connected by a stem 49 to a correspondingly facing exhaust valve 50 operably disposed in a recess 51 formed in piston member 33 and opening into lower chamber 41. The length of the stem 49 is such that when valve seat member 19 and piston member 33 are in their respective normal positions and supply valve 43 is in its seated position, exhaust valve 50 occupies a position unseated from an annular valve seat 52 surrounding one end of a passageway 53 extending coaxially through piston member 33 for establishing communication between control chamber 40—41 and atmospheric chamber 37. When exhaust valve 50 is operated to a seated position on valve seat 52, as will be hereinafter explained, communication between control chamber 40—41 and atmospheric chamber 37 is closed.

The change-over valve device 13 is conveniently located in the operator's cab within the operator's reach and comprises an upper casing section 54, a lower casing section 55, and an intermediate casing section 56 affixed between said upper and lower casing sections in axial alignment therewith. A piston member 57, coaxially and slidably operable in a coaxial bore 58 formed in intermediate casing section 56, comprises a piston 59 having one side thereof subject to atmospheric pressure in an atmospheric chamber 60 adjacent said one side and having the opposite side subject to fluid pressure in a pressure chamber 61 adjacent thereto, said pressure chamber being connected to conduit 14 via a passageway 62 formed in said casing section.

An exhaust valve 63, operably disposed in pressure chamber 61, is biased by a spring 64 toward a seated position on an annular valve seat 65 surrounding one end of a passageway 66 extending coaxially through piston member 57 and having said one end opening into said pressure chamber and the other end opening into atmospheric chamber 60, said exhaust valve thereby closing communication through said passageway in its said seated position. Exhaust valve 63 is restrained in its seated position as long as piston member 57 occupies a full-flow position, in which it is shown in FIG. 3 and to be defined hereinafter, said piston member being yieldingly operated to said full-flow position by a follower member 67 slidably operable in bore 58 in atmospheric chamber 60 and acting through a spring 68 compressibly interposed between said follower member and said piston member. The follower member 67 is provided with a stem 69 extending into upper casing section 54 to engage a roller 70 at one end of an arm 71, the other end of said arm being pivotally anchored to said casing section. A radial cam 72, rotatably disposed in upper casing section 54 and having a cam surface 73 in rolling contact with the roller 70, is manually operable by a handle 74 extending exteriorly of said casing section. The cam 72 is operable by handle 74 through an operating range extending from a maximum radius position, as indicated by legend and shown in FIG. 3 and in which piston member 57 is in its full-flow position, to a minimum radius position, as indicated by legend and shown in FIG. 4 and in which piston member 57 is permitted to be operated to an exhaust position (to be more full defined hereinafter) by a spring 75 disposed in pressure chamber 61 and acting in opposition to spring 68. The operating range of cam 72 is diagrammatically illustrated in FIG. 1 of the drawings between the two extreme positions of handle 74.

Exhaust valve 63 is axially connected by a stem 76 to a supply valve 77 operably disposed in an inlet chamber 78 formed in lower casing section 55 and connected to conduit 12 via a passageway 79 formed in said casing section. The supply valve 77 is adapted to occupy either a seated position on an annular valve seat 80 surrounding one end of a passageway 81 formed in a separating wall between inlet chamber 78 and pressure chamber 61, in which seated position communication between said chambers is cut off, or a position unseated from said valve seat, in which unseated position said communication is established.

As compared to spring 75, spring 68 has a very high compression value so that when cam 72 is operated by handle 74 to its maximum radius position, that is, the position in which cam surface 73 is in contact with roller 70 at a point on said surface lying in the maximum radius of the cam, spring 75, as well as spring 64, is compressed and piston member 57 moved to its free-flow position in which supply valve 77 is in its unseated position whereby fluid under pressure may flow unrestrictedly from conduit 12 to conduit 14 via passageway 79, inlet chamber 78, passageway 81, pressure chamber 61 and passageway 62. The compression value of spring 68 is such that even maximum fluid pressure in chamber 81 acting on the adjacent side of piston member 57, combined with the forces of springs 75 and 64, has very little compressive effect on said spring 68 so that the retention of piston member 57 in its free-flow position and of supply valve 77 in its unseated position is assured. The supply valve 77 will seat on valve seat 80 only upon a sufficient amount of upward movement thereof as viewed in the drawing, as determined by upward movement of follower member 67 and, therefore, of piston member 57, said amount of movement being the distance between the facing surfaces of said follower member, when in its free-flow position, and a separating wall 82 formed on upper casing section 54, said distance being indicated A in FIG. 3.

As cam 72 is operated by handle 74 out of its maximum radius position toward its minimum radius position, that is, the position in which cam surface 73 is in contact with roller 70 at a point on said surface lying in the minimum radius of the cam, compression is relieved from spring 75 so that said spring is permitted to expand and thereby in cooperation with fluid pressure in chamber 61 move piston member 57 and follower member 67 upwardly, as viewed in the drawing, to respective cut-off positions defined by abutment of said follower member with separating wall 82, as shown in FIG. 4, and in which position spring 64 is effective for moving supply valve 77 to its seated position to cut off further flow of fluid under pressure from conduit 12 to conduit 14.

In operation, with road conditions normal, the suspension apparatus is assumed to be charged with fluid under pressure from reservoir 8, and handle 74 of the change-over valve device 13 is operated to put cam 72 in its maximum radius position in which, as above noted, exhaust valve 63 is seated and supply valve 77 is unseated. Assuming the vehicle to be loaded, leaf spring 6 is deflected to an extent corresponding to vehicle load and lever 28 of the leveling valve device 10 is pivoted about point 29 in a counterclockwise direction, as viewed in FIGS. 1 and 2, to cause a corresponding amount of upward movement of stem 27 and, therefore, of supply-valve seat member 19 to its supply position, in which position and during which movement exhaust valve 50 and supply valve 43 are sequentially seated and unseated, respectively, in the order mentioned to first cut off venting of conduit 12 via passageway 53 and atmospheric chamber 37 and then open conduit 9 to said conduit 12 via ports 48, recess 44, passageway 47 and chamber 41.

The leveling valve device 10 is of the self-lapping type and, therefore, with fluid under pressure in lower chamber 41, said pressure builds up in upper chamber 40 via passageway 42 until such pressure acting on diaphragm 35 is sufficient to cause upward movement of piston member 33, with exhaust valve 50 and supply valve 43 following, until supply valve 43 seats on valve seat 46. With supply valve 43 in its seated position, further upward movement of piston member 33 causes valve seat 52 to be unseated from exhaust valve 50 to thereby allow reduction of fluid pressure in chamber 40—41 via passageway 53 and atmospheric chamber 37 until such pressure has been sufficiently reduced to permit spring 36 to move piston member 33 downwardly, as viewed in the drawing, to first effect reseating of exhaust valve 50 and then unseating of supply valve 43, thus maintaining the pressure of fluid supplied to conduit 12 at a constant pressure as determined by the amount of movement of lever 28, stem 27 and the valve seat member 19.

With fluid under pressure supplied to conduit 12, as immediately above described, at a pressure determined by the amount of deflection of leaf spring 6, said fluid under pressure, with cam 72 of the change-over valve device 13 in its maximum radius position and, therefore, supply valve 77 in its unseated position, is supplied to the air spring 7, whereby the load is accordingly distributed between the axles 2 and 3. Of course, if the load on the vehicle is lightened, the deflection of leaf spring 6 is accordingly reduced and lever 28 pivots about point 29 in a clockwise direction, as viewed in the drawing, whereupon spring 23 moves valve seat member 19 a corresponding amount toward its normal position thereby moving supply valve 43 with it to cause exhaust valve 50 to be unseated from valve seat 52 for effecting a reduction of pressure of fluid supplied to conduit 12 and maintaining said pressure constant in the manner above described.

Assuming the vehicle to move onto a road surface which, because of a steep up-grade or a slipper surface condition, makes it desirable to increase the tractive friction of the driving wheel 4 with the road surface, the operator of the vehicle operates handle 74 and thereby moves cam 72 of the change-over valve device 13 to its minimum radius position. As was noted above, when cam 72 is in its minimum radius position, follower member 67 is in its cut-off position, in which it is shown in FIG. 4, and in which spring 75 is effective for moving piston member 57 to its cut-off position and supply valve 77 is in its seated position on valve seat 80 to cut off further supply of fluid under pressure to conduit 14 and the air spring 7. Even though spring 68 has a comparatively high compression value, as compared to spring 75, said compression value of spring 68 is of such a predetermined value that, with piston member 57 in its cut-off position, fluid pressure trapped in air spring 7, conduit 14 and chamber 61 of the change-over valve device 13 is sufficient to slightly compress spring 68 to momentarily unseat valve seat 65 from exhaust valve 63 to allow reduction of said trapped fluid to a predetermined low pressure determined by said compression value of said spring 68. When fluid pressure in air spring 7, conduit 14 and chamber 61 has thus been reduced to the predetermined low pressure, spring 68 is effective for moving piston member 57 downwardly to a seated position on exhaust valve 63 to prevent further reduction of pressure in the air spring. Thus, assuming that the front end of the vehicle body 1 pivots about the front axle (not shown) and, therefore, acts as a fulcrum point, the reduction of fluid pressure in air spring 7 renders said air spring and, therefore, the non-driving axle 3 ineffective for supporting the amount of weight supported thereby before such reduction, so that the difference in the amount of weight supported by said air spring and said free-rotating axle before such pressure reduction and after such reduction is assumed by the leaf spring 6 and driving axle 2. With more weight thus shifted to the driving axle 2 and wheel 4, said wheel is provided with greater tractive friction for negotiating the up-grade or slipper pavement.

It should be noted that even though leaf spring 6 is further deflected as a result of the additional weight shifted thereto, the leveling valve device 10 is ineffective for supplying fluid at a greater pressure to air spring 7, because the supply valve 77 of the change-over valve device 13 remains in its seated position so long as cam 72 is in its minimum radius position. When the up-grade or slippery pavement has been negotiated, the operator of the vehicle should operate handle 74 to restore cam 72 to its maximum radius position for restoring normal operation of the suspension apparatus.

It should be obvious to one skilled in the art that the length of stem 76 connecting the supply valve 77 to the exhaust valve 63 of the change-over valve device 13 may be such that said supply valve will occupy its seated position on valve seat 80 when cam surface 73 is in contact with roller 70 at some intermediate point or position on cam 72 between its maximum radius and minimum radius positions and that the amount of reduction in the pressure of fluid in air spring 7 would then correspond to the amount of movement of cam 72 between said intermediate position and the minimum radius position.

Having now described the invention, what we claim as new and desire to secure by Letters Patent is:

1. In a suspension arrangement for a tractor vehicle having a load-carrying body spring-supported on a multiplicity of axles at least one of which is a driving axle and another is a non-driving axle, the body being supported on the driving axle by a mechanical spring and on the non-driving axle by an air spring suppliable with pressurized fluid from a source of fluid under pressure, the combination of conduit means providing for flow of fluid under pressure from the source to the air spring, a leveling valve device interposed in said conduit means between the source of fluid under pressure and the air spring, a lever operatively connecting said leveling valve device to the mechanical spring for rendering said leveling valve device operable responsively to load deflection of the mechanical spring for effecting supply of fluid from the source to the air spring, through said conduit means, at a pressure corresponding to the amount of said deflection for distributing the vehicle load between the driving axle and the non-driving axle in a certain ratio, and a changeover valve device interposed in said conduit means between said leveling valve device and the air spring and effective in one position to provide unrestricted flow of fluid under pressure through said conduit means, said change-over valve device being manually operable to a different position in which it cuts off the supply of pressurized fluid to the air spring and vents the air spring to atmosphere for reducing fluid pressure therein a predetermined amount for effecting distribution of the vehicle load between the non-driving axle and the driving axle at a different ratio.

2. A suspension arrangement for a tractor vehicle having multiple wheel-axle units including a driving wheel-axle unit and a non-driving wheel-axle unit in tandem relation, said arrangement comprising, in combination, a mechanical spring for supporting the vehicle body on the driving wheel-axle unit, pneumatic spring means for supporting the vehicle body on the non-driving wheel-axle unit, a source of pneumatic pressure on the vehicle, a conduit through which pneumatic pressure may be transmitted from the said source to the pneumatic spring means, leveling valve means interposed in said conduit between said source of pneumatic pressure and said pneumatic spring, a lever associated with said leveling valve means and mechanically engaged by said mechanical spring for effecting movement thereof according to the deflection of the said mechanical spring with variations in load carried by the vehicle body for correspondingly effecting operation of said leveling valve device for controlling the pneumatic pressure transmitted through said conduit means to the pneumatic spring means to maintain a constant ratio of division of load supported by the said two wheel-axle units, and change-over valve means interposed in said conduit means between said leveling valve means and said pneumatic spring means effective in one position to provide unrestricted communication through said conduit means from the leveling valve means to the pneumatic spring means and having another position in which it cuts off application of pneumatic pressure from the leveling valve means through said conduit means to the pneumatic spring means and effects a predetermined reduction of the pneumatic pressure in the pneumatic spring means, thereby to effect a variation of the said certain ratio of distribution of load supported between the said two wheel-axle units.

3. A suspension arrangement for use on a tractor vehicle having a front axle and two rear axles, in tandem, one of the said rear axles being a driving axle and the other of said rear axles being a non-driving axle, said arrangement comprising, in combination, a mechanical spring associated with the driving axle for supporting a portion of the vehicle body thereon, the amount of deflection of said mechanical spring being proportional to the portion of the vehicle load supported by the driving axle, an air spring associated with the non-driving axle for supporting the vehicle body and the load thereon cooperatively with said mechanical spring, a source of fluid under pressure, conduit means providing for flow of fluid under pressure from said source to said air spring, first valve means interposed in said conduit means between said source and said air spring, a lever operatively interposed between said first valve means and said mechanical spring for rendering said first valve means operable responsively to the deflection of said mechanical spring for effecting supply of fluid from said source to said air spring through said conduit means at a pressure corresponding to the amount of deflection of said mechanical spring caused by the portion of the vehicle load thereon for causing said air spring to be proportionately pressurized and the non-driving axle to assume a correspondingly varied portion of vehicle load, and manually operable valve means interposed in said conduit means between said first valve means and said air spring, said manually operable valve means having one position, in which communication through said conduit means between said first valve means and said air spring is unobstructed, and being operable to a different position in which said communication is cut off and said air spring is opened to atmosphere for reducing fluid pressure therein to a certain predetermined value and thereby causing a corresponding load reduction on the non-driving axle and a corresponding load increase on the driving axle.

4. The combination defined in claim 3, wherein said first valve means comprises a casing mounted on the vehicle body, said lever being pivotally supported at one end on said casing, the other end having rolling contact with mechanical spring, said lever being pivotable about said one end by load deflection of the mechanical spring, and self-lapping valve mechanism operatively connected to said lever and operable in said casing responsively to said load deflection for maintaining supply of fluid in the air spring at a constant pressure corresponding to the amount of said load deflection.

5. The combination defined in claim 3, wherein the manually operable valve means comprises a casing interposed in said conduit means and having therein passage means connected to said conduit means to permit flow of fluid under pressure in said conduit means through the valve means, a supply valve operable to one position, in which flow of fluid under pressure through said passage means is uninterrupted, and being biased toward a different position in which said flow through said passage means is cut off, an exhaust valve rigidly connected to said supply valve for movement therewith, a piston member having one side thereof subjected to fluid pressure prevailing in the air spring and including an atmospheric passageway through which the air spring may be vented to atmosphere via said conduit means, a valve seat formed at one end of said atmospheric passageway, said piston member being operable to a full-flow position in which said supply valve is moved to its said one position and said valve seat is seated on said exhaust valve, manually operable cam means including a follower member, a spring interposed between said piston member and said follower member to provide a yieldable connection therebetween, the force of said spring acting in opposition to fluid pressure on said one side of said piston member, said cam means being operable to a first position, in which said spring is placed under a certain degree of compression to cause said piston member to be moved to its full-flow position, and being operable to a second position in which the degree of compression on said spring is reduced and the pressure of fluid acting on said piston member is effective for causing said piston member to be moved to an exhaust position, in which said supply valve is in its said different position for cutting off supply of fluid under pressure to the air spring and in which said valve seat is unseated from said exhaust valve until pressure of fluid acting on said one side of said piston member and, therefore, in the air spring, is reduced according to the degree of compression reduction of said spring.

References Cited in the file of this patent

UNITED STATES PATENTS

| | | |
|---|---|---|
| 2,771,303 | Frazier | Nov. 20, 1956 |
| 2,864,454 | La Belle | Dec. 16, 1958 |
| 2,934,351 | Masser | Apr. 26, 1960 |